US006331689B1

(12) United States Patent
Branston et al.

(10) Patent No.: US 6,331,689 B1
(45) Date of Patent: Dec. 18, 2001

(54) METHOD AND DEVICE FOR PRODUCING A POWDER AEROSOL AND USE THEREOF

(75) Inventors: David-Walter Branston, Effeltrich; Guenter Lins; Jobst Verieger, both of Erlangen, all of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/719,830

(22) PCT Filed: Jun. 15, 1999

(86) PCT No.: PCT/DE99/01745
§ 371 Date: Mar. 12, 2001
§ 102(e) Date: Mar. 12, 2001

(87) PCT Pub. No.: WO99/66096
PCT Pub. Date: Dec. 23, 1999

(51) Int. Cl.[7] .................................................. B23K 10/00

(52) U.S. Cl. ............................... 219/121.59; 219/121.47; 219/121.51; 427/446

(58) Field of Search ......................... 219/121.59, 121.47, 219/121.51, 121.54, 121.48, 121.36, 121.49, 75, 66; 427/446, 456, 562, 561, 450, 576; 423/592, 593

(56) References Cited

U.S. PATENT DOCUMENTS 3,627,965 * 12/1971 Zweig .................................... 219/66
4,142,089 * 2/1979 Lau et al. ........................ 219/121.47
4,597,983 7/1986 Kuehne .
5,110,618 5/1992 Faust .
5,366,770 * 11/1994 Wang ................................... 505/477
5,540,959 * 7/1996 Wang ................................... 427/561
5,827,350 10/1998 Magill .
5,928,719 7/1999 Mishima .

FOREIGN PATENT DOCUMENTS 28 42 232 C2 4/1980 (DE) .
34 17 439 A1 11/1985 (DE) .
37 29 391 A1 3/1989 (DE) .
39 37 983 A1 5/1991 (DE) .
WO 95/03872 7/1994 (DE) .
WO 96/03216 7/1995 (DE) .
0 411 499 A1 6/1991 (EP) .
0 441 300 A2 8/1991 (EP) .
08158033 6/1996 (JP) .

* cited by examiner

*Primary Examiner*—Teresa Walberg
*Assistant Examiner*—Quang Van
(74) *Attorney, Agent, or Firm*—Eckert Seamans Cherin & Mellott, LLC

(57) ABSTRACT

Powder aerosols are introduced into a gas stream in metered form and without any aggregates. To this end, according to the invention, a powder is drawn, for example by mechanical device, from a reservoir area and is converted into a powder aerosol which is introduced within a flowing gas stream into a container to which ultrasound is applied. The ultrasound breaks down powder lumps and aggregates, and the aerosol can be fed in a uniform, fine powder distribution within the gas stream to a plasma burner. Apparatus for carrying out this invention includes a feed tube (4) connected to a mechanical powder feed device (6), so that an aerosol containing the powder enters a vessel (10) containing the ultrasound horn (2). The method and the associated apparatus are used for the coating of components, preferably for applying a protective coating to a turbine blade.

13 Claims, 1 Drawing Sheet

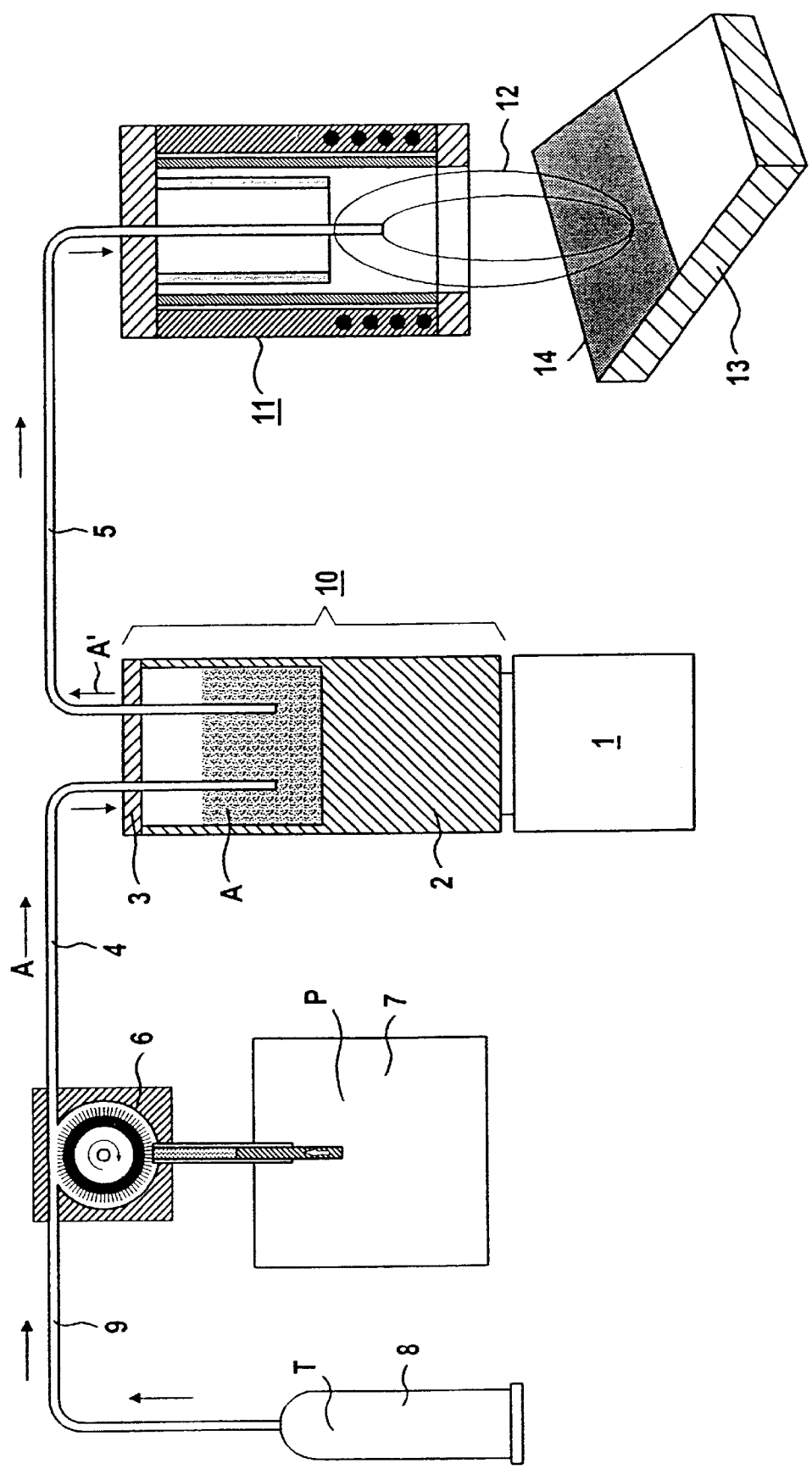

METHOD AND DEVICE FOR PRODUCING A POWDER AEROSOL AND USE THEREOF

BACKGROUND

1. Field of the Invention

The invention relates to a method for producing a powder aerosol, which can be fed in metered form via a gas stream to a plasma burner, at a constant mass flow rate, without any aggregates. In addition, the invention also relates to an apparatus for producing a powder aerosol having a container which is connected via an ultrasound horn to an ultrasound transmitter and which has a feed tube and an outlet tube.

2. Related Art

A high-power plasma burner, with radio-frequency excitation, can be used to completely vaporize substances which are in the form of powder, in a short time, and then deposit, from the vapor phase, a coating with a predetermined composition onto a substrate, with a high growth rate. A first application for this method, which is known as plasma flash evaporation, is the evaporation of fine-grained powder composed of yttrium-barium-copper oxide, with subsequent deposition of a high-temperature superconductor layer (HTSL). Another major application is the coating of components, for example the application of a protective coating to a turbine blade.

In order to propel the powder into the plasma, the powder is first introduced into a propellant gas, so that an aerosol is produced which can be passed into the plasma burner. The aerosol must be free of aggregates of powder particles which cannot be vaporized, that is to say aggregates formed from individual particles. Preferably, the powder feed process is reproducible and uniform, that is to say free of variations with time.

Various methods, associated with the general plasma spraying technique, are known for producing the aerosol required for plasma flash evaporation. For example, a disk feed device operates in such a way that an amount of powder which is defined by the dimensions of a metering groove is deposited continuously, by means of the metering groove, on a slowly rotating disk. The powder, which revolves with the disk, is moved by a wiping apparatus to the edge of the disk where it falls into a retaining apparatus, where it is retained within a flowing gas stream. In the case of powders whose grain size is very fine, for example in a range equal to or less than 20 $\mu$m, the dispersion of the powder is highly restricted by the forces which act between the particles. This leads to aggregates with dimensions in the millimeter range entering the gas stream at certain time intervals rather than a continuous flow of discrete, individual powder grains, which are separated from one another, as required. Even if the aggregates are broken down within the gas stream during transportation to the plasma burner, the lumpy structure of the introduced powder results in fluctuations in the mass flow rate which are not acceptable, that is to say a variation in the amount of powder introduced into the plasma over time. Screw-type or worm-type feed devices, which are also known from the prior art, and in which the powder is fed by a worm gear to a mixing area where it enters the propellant gas stream, have the same disadvantage.

In the case of a brush metering device, the powder, which is formed into a plug in the form of a cylindrical body, is pushed forward through a tube to a rotating metal brush which removes from the plug body an amount of powder proportional to the feed rate. A gas stream passing through the brush area picks up the powder and transports it to the point at which it is required. Experience has shown that the process of rubbing the powder off the plug body results in aggregates which cannot be vaporized.

WO 96/03216 A1 discloses a powder feed device which operates on the ultrasound principle. In this case, the powder to be fed has ultrasound applied to it in a vessel in which it is also stored, is swirled, its accumulations are broken down, and it is picked up by a gas flow passing through the vessel. Experiments have shown that the feed process is reproducible and is free of fluctuations. This method is limited by the fact that only a limited amount of powder can be stored and fed. In particular, the feed rate, that is to say the mass fed per unit time, can in this case not be adjusted independently of the gas flow rate, since the gas flow also contributes to the swirling of the powder, in addition to the effect of the ultrasound.

Against this background, the object of the invention is to improve the preparation of the aerosol and to provide an associated apparatus and to specify a suitable application.

SUMMARY OF THE INVENTION

In accordance with the invention, mechanical means are used to convert a powder to an aerosol. For the purposes of the invention, a gas stream is fed with the powder aerosol to a plasma burner through a storage or buffer means to which ultrasound can be advantageously applied.

The invention assures the powder aerosol is present in the gas stream with a uniform, fine particle distribution. In the process, the powder aerosol, which has been treated in this way, uniformly has its aggregates broken down, and any initial fluctuation in the flow rate of the powder is stabilized.

In a preferred embodiment apparatus for carrying out the invention employs a feed tube connected to a mechanical powder feed device that dispenses the powder within a gas stream flowing within the feed tube. The feed tube is connected at a downstream end to a storage and/or buffer vessel to which ultrasound is applied A vessel outlet conduit conveys the gas stream to the plasma burner. The powder aerosol enters the volume formed by the ultrasound vessel, is made more uniform by the effect of the ultrasound, and leaves the ultrasound vessel as a more uniform and continuous aerosol flow and is fed to a plasma burner. In this case, the vessel is preferably closed at the top by a cover. In particular, the vessel may at the same time contain the ultrasound horn.

The invention thus makes it possible for a very fine powder to be introduced into a plasma in any desired amount continuously, without aggregates, reproducibly and without any variation in the mass flow rate of the powder. This is achieved by the combination of a disk, worm or brush feed device using the ultrasound principle on which WO 96/03216 A1 is based.

The invention is used for the coating of components and is particularly suitable for applying a protective coating to turbine blades. In this case, it is particularly advantageous that suitable coating thicknesses can be deposited in reasonable times due to the slight relative movement which is possible between the apparatus according to the invention and the turbine blades.

BRIEF DESCRIPTION OF THE DRAWINGS

Further refinements and advantages of the invention result from the following description of a FIGURE of an exemplary embodiment, based on the single FIGURE in the drawing, in conjunction with the patent claims.

DESCRIPTION OF THE PREFERRED EMBODIMENT

The figure shows an exemplary embodiment of a powder feed system according to the invention, which is intended for operation of a plasma burner. The plasma burner is an induction plasma generator 11 which is excited at radio frequency and forms an inductively coupled plasma, with a directed plasma flame 12, generated from a fuel gas. An aerosol which is completely vaporized owing to the high plasma temperatures is introduced into the plasma flame 12. This makes it possible to deposit materials from the vapor phase onto component surfaces, with a high growth rate.

The invention is intended to be used to apply protective coatings to turbine blades. A portion of a curved turbine blade 13 is indicated in the figure, including the coating 14. Such turbine blades are subject to severe stresses in conjunction with cycling temperatures during operation, for which reason the blades, which are made from special alloys, are coated. By way of example, coatings composed of ceramic, in particular zirconium oxide ($ZrO_2$), or else other oxidic or nitridic materials, may be used. The coating materials may also be interchanged in induction plasma burners without any major effort, so that multicoating systems can easily be produced.

An ultrasound horn 2, which is connected to an ultrasound generator 1 in order to generate ultrasound at a predetermined frequency, is designed partially in the form of a hollow body in order to transmit the ultrasound at a suitable wavelength, and forms a container to which ultrasound can be applied. A "cup-type ultrasound horn" is thus defined as the ultrasound vessel 10, and can be closed by a cover 3. The cover 3 has a feed tube 4 and an outlet tube 5 passing through it, with the feed tube 4 and the outlet tube 5 being arranged symmetrically with respect to one another.

In an alternative embodiment, a separate ultrasound horn 2 can be connected, for ultrasound purposes, to a separate vessel.

A powder feed device 6, which may be a mechanical disk, worm, brush or other feed device which is suitable for the metering of very fine powders and is shown in the figure, is used to introduce a powder P, which is stored in a container 7, into a gas stream of a propellant gas T, thus producing a powder aerosol A.

The powder feed device 6 is connected to the cup-type ultrasound horn 2 in such a way that the powder aerosol A produced by it is passed through the feed tube 4 into the interior of the cup-type ultrasound horn 2, where it floats in the gas stream. If ultrasound were not applied, relatively heavy particles, such as powder lumps or aggregates, would in this case be deposited on the bottom of the vessel 10.

The affect of the ultrasound is to breakdown the powder lumps or aggregates, which has led to problems in the past. A powder aerosol A', which is processed with a desired, uniform, fine particle distribution, leaves the cup-type ultrasound horn 2 through the outlet tube 5, and can be fed in the gas stream to the plasma burner 11.

The specific combination of the powder feed device 6 and the ultrasound device which has been described in detail, above, advantageously results in the unexpected affect of the powder flow being made uniform. The process of making the powder flow uniform can be explained by the storage and/or buffer affect of the volume in the vessel, to which the ultrasound is applied, with the powder aerosol A. This results in a particularly high quality coating 14 being produced by the plasma burner 11 on a substrate, in particular on a turbine blade 13.

What is claimed is:

1. A method for producing a powder aerosol which can be fed in metered form via a gas stream to a plasma burner, for which purpose the powder aerosol without any aggregates is required to be provided at a constant mass flow rate, comprising the following method steps:

drawing a powder from a reservoir area by mechanical means;

converting the powder, via a propellant gas, to the powder aerosol;

introducing the powder aerosol into a container to which ultrasound can be applied and whose volume to which ultrasound is applied is used as a storage and/or buffer means for the aerosol;

using the ultrasound affect to break up powder lumps or aggregations in the powder aerosol, thus making the powder aerosol more uniform and finer; and feeding the powder aerosol, which has been made more uniform and finer, to the plasma burner.

2. The method of claim 1 including the step of applying the vaporized powder aerosol produced by the plasma burner to a turbine blade as a protective coating.

3. The method claimed in claim 2, wherein the protective coating is a ceramic coating.

4. The method claimed in claim 2 wherein the coating is composed of zirconium oxide ($ZrO_2$).

5. An apparatus for producing a powder aerosol, comprising a container which is connected to an ultrasound transmitter via an ultrasound horn and which has a feed tube and an outlet tube, in which case the feed tube is connected to a powder feed device which includes connections for a reservoir container for a powder and for a propellant gas, and with the outlet tube being connected to a plasma burner.

6. The apparatus as claimed in claim 5, in which the ultrasound horn includes a vessel in the form a cup.

7. The apparatus as claimed in claim 6, wherein the cup forms the container.

8. The apparatus as claimed in one of claim 5 wherein the container is closed at the top by a cover.

9. The apparatus as claimed in claim 5 wherein the feed tube and the outlet tube are arranged symmetrically with respect to the ultrasound horn or the container to which ultrasound is applied.

10. The apparatus as claimed in claim 5, wherein the plasma burner includes an induction plasma generator.

11. The apparatus of claim 2 wherein the vaporized powder aerosol produced by the plasma burner is applied as a protective coating to a turbine blade.

12. The apparatus of claim 11 wherein the coating is ceramic.

13. The apparatus of claim 11 wherein the coating is zirconium oxide ($ZrO_2$).

* * * * *